United States Patent Office 3,409,646
Patented Nov. 5, 1968

3,409,646
AMINOAMIDES
Homer J. Sims, Horsham, Robert L. Skiles, Warminster, and Hans P. Frohlich, Churchville, Pa., assignors to Rohm & Haas Company, Philadelphia, Pa., a corporation of Delaware
No Drawing. Filed Aug. 10, 1965, Ser. No. 478,732
5 Claims. (Cl. 260—404.5)

ABSTRACT OF THE DISCLOSURE

Aminoamides of the general structure

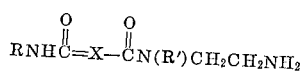

and

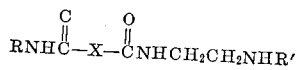

They are useful for the control of phytopathogenic fungi and bacteria.

---

This invention deals with unsymmetrical bis-amides and their acid-addition salts as new compositions of matter. More particularly this invention concerns aminoamides which result from the hydrolysis of particular imidazolines. This invention further deals with agricultural compositions for preventing and eradicating bacteria and fungal diseases of plant life. It further deals with a method for controlling such bacterial and fungal diseases. The active ingredients in these agricultural compositions and processes are specific aminoamides which result from the hydrolysis of particular imidazolines.

The aminoamides of the present invention may be represented by the formulas (I)

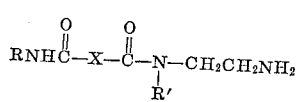

and (II)

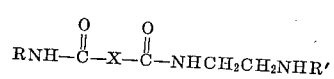

in which R is a tertiary alkyl group of 4 to 24 carbon atoms;
R' is hydrogen, 2-aminoethyl or 2-hydroxyethyl and
X is ethenylene, ethylene, trimethylene, dodecenylethylene or 1,2-cyclohexenylene.

The tertiary-alkyl group represented by R is an alkyl group having the configuration

in which A represents alkyl groups that total from 3 to 23 carbon atoms, preferably 11 to 23 carbon atoms. However, the sum total of carbon atoms in the tertiary-alkyl group should not exceed 24.

Typically, R represents tertiary-butyl, tertiary-octyl, tertiary-dodecyl, tertiary-octadecyl, tertiary-eicosyl and tertiary-tetracosyl.

Commercially available compounds, most usually tertiaryalkylamines, which may be used to provide the tertiaryalkyl group, as generally made, contain mixtures of such alkyl groups within stated carbon content ranges. Most generally the intermediate imidazolines used in this invention are made from tertiary alkylamines as one of the reactants. The commercial mixtures of tertiary-alkylamines may be separated into individual components by fractional distillation and other known means. Particularly effective results are obtained when the said commercial compounds are made up of mixtures of tertiary alkyl groups containing 12 to 14 carbon atoms and 18 to 22 carbon atoms. Of course, this must not be construed as a limitation, since excellent results will be obtained when R represents a tertiary-alkyl group at any point within the stated 4 to 24 carbon content range.

The aminoamides of the present invention are prepared by hydrolysis of a compound having the following formula:

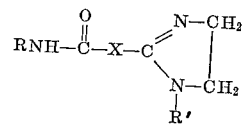

This reaction may be carried out in water or in the presence of a solvent wherein both reactants dissolve such as acetone or alcohol or in any combination of these media. The hydrolysis may be carried out at any temperature within the range of 25 to 100° C. However, the rate of the reaction is increased as the temperature is raised within the stated range, therefore, it is preferable to carry out the reaction between 80 and 100° C. Excess water may be removed from the reaction mixture under vacuum or by azeotropic distillation with benzene or a similarly suitable solvent. It is important that the temperature at which the water is removed from the reaction mixture does not exceed 100° C. for any appreciable length of time. Prolonged reaction temperature in excess of 100° C. during the removal of water will cause the reaction to reverse so as to close the ring and reform the imidazoline which is being hydrolyzed. This reaction does not require the use of any catalyst. As a matter of fact, the inclusion of many of the common catalysts used in hydrolysis reactions will hinder rather than help the present reaction. It is especially important not to add any acidic material such as sulfuric, hydrochloric or acetic acids to the reaction mixture. These materials when added in equimolar or greater amounts will actually retard the hydrolysis rather than enhance it. The reaction may be followed to completion by disappearance of the C=N absorption at 6.25 mircons in the infrared and about 230 millimicrons in the ultraviolet spectra.

As is evident to one skilled in the art, the hydrolysis of the imidazolines, where R' is other than hydrogen, leads to a mixture of isomers. Opening of the imidazoline ring in one way leads to a tertiary amide and primary amine function while opening in the other manner leads to a secondary amide and secondary amine. This aspect of the invention can be more easily shown by the following equations.

(a) When the imidazoline ring opens at the

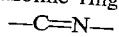

portion, a tertiary amide with a primary amine function is formed.

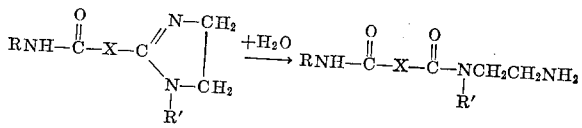

(b) When the imidazoline ring opens at the

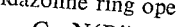

portion, a secondary amide wtih a secondary amine function is formed.

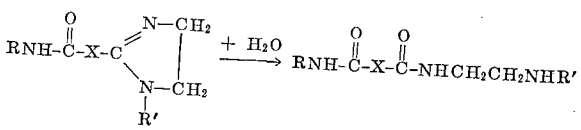

Although it is possible for the hydrolysis to proceed by just one of the routes, ordinarily both tertiary and secondary amides will be formed at the same time by the hydrolysis of the imidazolines; these amides may be separated one from the other by means well known to one skilled in the art. Fractionation by chromotography is one of the more important methods of carrying out such a separation. This invention, of course, contemplates such separation. The biocidal properties of the aminoamides of the present invention are not affected by such separations and said aminoamides will function in such manner whether they are separated as individual tertiary or secondary amides or whether a mixture of both in any proportion.

It must be kept in mind that two types of mixtures are involved in the preparation of the aminoamides of the present invention. The first mixture is the one previously discussed wherein both tertiary and secondary aminoamides are formed in varying proportions during the hydrolysis of the imidazoline. The second mixture involves the variance in numbers of carbon atoms in the tertiary-alkyl group represented by R. That is, since those commercially available compounds which are used to provide the tertiary-alkyl group often contain mixtures of such groups within a stated carbon content range, the imidazolines produced from these compounds will have this range of carbon atoms and the aminoamides obtained as a result of the hydrolysis of these imidazolines will also have the mixture of tertiary-alkyl groups. Therefore, the R group on any one aminoamide molecule can have any number of carbon atoms within the stated carbon content range. Of course, it is possible to separate the aminoamides made up of the varying tertiary alkyl groups into groups having only one particular number of carbon atoms per alkyl group. These separations, which are contemplated within this invention, can be accomplished by chromatographic fractionation and various other means well known to the art.

While hydrolysis of the stated imidazolines is the preferred method for preparing the aminoamides of the present invention, various other methods known to one skilled in the art may be employed. For example, said aminoamides can be prepared by acrylating a diamine with the acid chloride of an amic acid.

The imidazolines which are hydrolyzed to produce the aminoamides of the present invention can be produced by reacting an amic acid of the formula $$R-NH\overset{O}{\underset{\parallel}{C}}X-\overset{O}{\underset{\parallel}{C}}-OH$$

with a diamine of the formula $$H_2NCH_2CH_2NHR'$$

at the reflux temperature of the reaction system. While it is possible to conduct the reaction without a solvent, one generally employs an inert aromatic solvent, such as, benzene, toluene, xylene or similarly suitable compound. The reaction is conducted at the boiling point of the reaction system and is continued until two moles of water per mole of acid are removed. The water is removed during the reaction by distillation or by an azeotropic distillation when a solvent is employed. The amic acid and diamine are generally employed in equi-molecular quantities; however, an excess of amine may be used where this is desired to assure highest yields. The excess be removed by distillation under reduced pressure.

It is to be construed that the present invention also includes the acid-addition salts of these aminoamides. In certain cases, a salt may show a biological advantage over the free-base form. For instance, a salt may have increased water solubility, increased ease of formulation, and more favorable phytotoxic characteristics. There are applications where such improved properties are highly desirable. These salt forms may be prepared by neutralizing the aminoamide with the stoichiometric equivalent of an agriculturally acceptable acid such as hydrochloric, hydrobromic, nitric, sulfuric, phosphoric, boric, formic, acetic, propionic and oxalic.

The aminoamides employed in the present invention may be more fully understood from the following example which are offered by way of illustration and not by way of limitation.

Example 1

Preparation of (A) 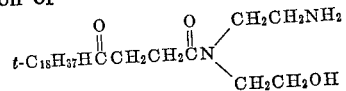

and (B) 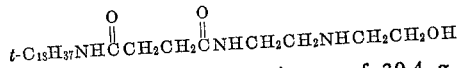

In a suitable apparatus, a mixture of 30.4 g. (0.06 mole) of β[1-(2-hydroxylethyl)-2-imidazolin-2-yl]N-t-octadecylpropionamide and 50 g. of water was heated at 75° C. with stirring for 3 hours. An amount of benzene (about 50 ml.) sufficient to remove the excess water was added and the mixture was refluxed in such a manner as not to exceed 100° C. for any appreciable length of time. After removal of solvent the residue, a brown viscous oil, weighed 31.3 g. The ultraviolet spectrum showed no absorption maximum in the 230 millimicron region. The infrared spectrum had a peak at 6.05 microns but none at 6.25 microns.

The product was analyzed for primary amine function which showed that it was 60% tertiary amide (Formula A) and 40% secondary amide (Formula B). This mixture of tertiary and secondary amides occurs as a result of the manner in which the imidazoline ring opens.

By analysis the residue was found to contain 70.87% C, 12.11% H, 7.38% total N, 2.45% titratable N and 1.58% N in primary amino ($NH_2$) groups.

The calculated values on the basis of the structures made from a t-octadecylamine having a neutral equivalent of 338 are as follows: 70.86% C, 12.00% H, 8.00% total N, 2.66% titratable N, and 2.66% N contained in primary amino groups ($NH_2$).

The neutral equivalent of the residue as determined by perchloric acid titration was 527 (theoretical 524).

Example 2

Preparation of (A) 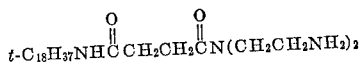

and (B) 

A mixture of 56.6 g. (0.1 mole) of β[1-(2-aminoethyl)-2-imidazolin-2-yl]N-t-octadecylpropionamide and 5.0 g. of water was heated at 75° C. with stirring for 3 hours. An amount of benzene (about 50 ml.) sufficient to remove the excess water azeotropically was added and the mixture was refluxed in such manner as not to exceed 100° C. for any appreciable length of time. After removal of solvent, the residue, a brown viscous oil, weighed 58.3 g. The ultraviolet spectrum showed no absorption maximum in the 230 millimicron region. The infrared spectrum had a peak at 6.05 microns but none at 6.25 microns.

The product was analyzed for primary amine function which showed that it was 90% tertiary amide (Formula A) and 10% secondary amide (Formula B).

By analysis the residue was found to contain 70.21% C, 12.10% H, 10.29% total N, 4.25% titratable N, and 4.28% N in primary amino ($NH_2$) groups. The calculated values on the basis of the structures made from a t-octadecylamine having a neutral equivalent of 338 are as follows: 70.99% C, 12.21% H, 10.69% total N, 5.35% titratable N, 2.67% N in primary amino groups in the secondary amide (Formula B) and 5.35% N in primary amino groups in the tertiary amide (Formula A).

The neutral equivalent of the residue as determined by perchloric acid titration was 290 (theoretical 262).

Example 3
Preparation of (A)

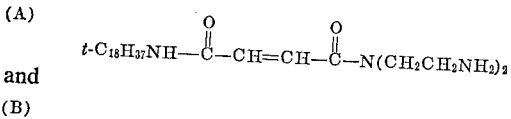

and (B)

$t\text{-}C_{18}H_{37}NH-\overset{O}{\overset{\|}{C}}-CH=CH-\overset{O}{\overset{\|}{C}}-NHCH_2CH_2NHCH_2CH_2NH_2$ In a manner similar to Example 1, 55.2 g. (0.08 mole) of β[1-(2-aminoethyl)-2-imidazolin-2-yl]N-t-octadecylacrylamide was hydrolyzed to yield 55 g. of residue which consisted of a mixture of Formulas A and B.

By analysis the residue was found to contain 71.22% C, 11.83% H, and 10.47% total N. The calculated values on the basis of the structures made from a t-octadecylamine having a neutral equivalent of 338 are as follows: 71.26% C, 11.80% H and 10.37% N.

Example 4
Preparation of (A)

$t\text{-}C_{18}H_{37}NH\overset{O}{\overset{\|}{C}}CH=CH\overset{O}{\overset{\|}{C}}N(CH_2CH_2OH)CH_2CH_2NH_2$ and (B)

$t\text{-}C_{18}H_{37}NH\overset{O}{\overset{\|}{C}}CH=CH\overset{O}{\overset{\|}{C}}NHCH_2CH_2NHCH_2CH_2OH$ In a manner similar to Example 1, 48.7 g. (0.097 mole) of β[1-(2-hydroxyethyl)-2-imidazolin-2yl]N-t-octadecylacrylamide was hydrolyzed to yield 48.5 g. of residue which consisted of a mixture of Formulas A and B.

By analysis the residue was found to contain 70.55% C, 11.58% H, and 8.06% total N. The calculated values on the basis of the structures made from a t-octadecylamine having a neutral equivalent of 338 are as follows: 71.13% C, 11.63% H, and 8.03% N.

The neutral equivalent of the residue as determined by perchloric acid titration was 510 (theoretical 523). The infrared spectrum had a peak at 6.03 microns.

Example 5
Preparation of (A)

$t\text{-}C_{18}H_{37}NH\overset{O}{\overset{\|}{C}}-CH_2CH_2-\overset{O}{\overset{\|}{C}}NHCH_2CH_2NH_2$ In a manner similar to Example 1, 10 g. of β(2-imidazolin-2-yl)N-t-octadecylpropionamide was hydrolyzed using 2 g. of water to yield 10.1 g. of residue.

By analysis the residue was found to contain 7.51% total N. The calculated value for the total N was 8.73% on the basis of the structure made from a t-octadecylamine having a neutral equivalent of 338.

The neutral equivalent of the residue as determined by perchloric acid titration was 505 (theoretical 481).

Example 6
Preparation of (A)

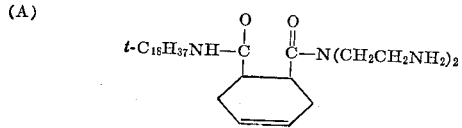

and (B)

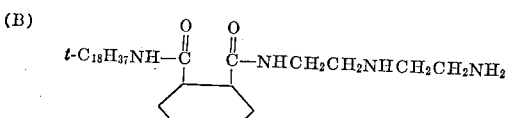

In a manner similar to Example 1, 21 g. of 2[1-(2-aminoethyl)-2-imidazolin-2-yl]N-t-octadecyl-1,2,3,6-tetrahydrobenzamide was hydrolyzed with 5 g. of water to yield 21 g. of residue which consisted of a mixture of Formulas A and B.

By analysis the residue was found to contain 72.00% C, 11.22% H, and 9.45% total N. The calculated values on the basis of the structures made from a t-octadecylamine having a neutral equivalent of 338 are as follows: 72.92% C, 11.81% H and 9.72% total N.

These compounds may be termed 1,2-cyclohex-4-enyl-ene derivatives.

Example 7
Preparation of (A)

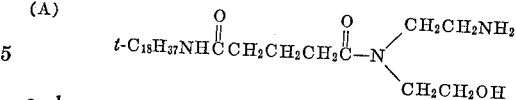

and (B)

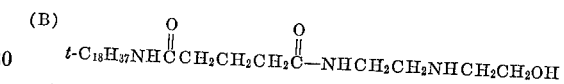

In a manner similar to Example 1, 35.8 g. γ[1-(2-hydroxyethyl)-2-imidazolin-2-yl]N-t-octadecylbutyramide was hydrolyzed to yield 36.8 g. of residue which consisted of a mixture of Formulas A and B.

The neutral equivalent of the residue as determined by perchloric acid titration was 446. The infrared spectrum had a peak at 6.03 microns.

Example 8
Preparation of (A)

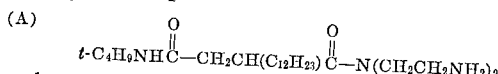

and (B)

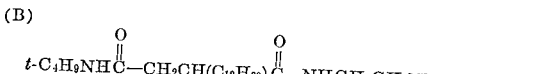

In a manner similar to Example 1, 35 g. of the compound represented by the formula

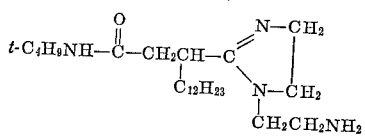

was hydrolyzed to yield a residue which consisted of a mixture of the Formulas A and B. The ultraviolet spectrum showed no maximum in the 230 millimicron region. The $C_{12}H_{23}$ portion of the acid moiety of the propionamide is a dodecenyl group of the following formula:

$$(CH_3)_3CCH_2C(CH_3)_2CH_2CH=CHCH_2-$$

The aminoamides of this invention possess biocidal properties and are especially useful as agricultural fungicides and bactericides. They are particularly outstanding for the control of apple scab, possessing both protective and eradicative properties, and of bacterial leaf spot. When the aminoamides are used as agricultural and horticultural pesticides on living plants, it is preferred that they be relatively non-phytotoxic.

Compositions are prepared from the compounds of this invention by taking them up in an agronomically acceptable carrier, adding surfactants or other additives, if desired, and admixing to give uniformly formulated mixtures. By "agronomically acceptable carrier" is meant any substance which can be used to dissolve, dispense or diffuse the chemical to be used therein without impairing the effectiveness of the toxic agent and which does no permanent damage to such environment as soil, equipment and agronomic crops.

For use as pesticides, the compounds of this invention are usually taken up in an agronomically acceptable carrier or are formulated so as to render them suitable for subsequent dissemination as pesticides. For example, the aminoamides may be formulated as wettable powders, emulsion concentrates, dusts, granular formulations, aerosols or flowable emulsion concentrates. In such formulations, the aminoamides are extended with a liquid or solid carrier and, when desired, suitable surfactants are incorporated.

The compounds of this invention may be dissolved in a water-miscible liquid such as ethanol, isopropanol or acetone, and such solutions extended with water.

The aminoamides may be taken up on or mixed with a finely particled solid carrier, such as clays, inorganic silicates and carbonates, silicas and organic carriers. Dust concentrates in which aminoamides are present in the range of 20 to 80% are commonly made and these are subsequently extended with additional solid to about 1 to 20% for ultimate application.

Wettable powder formulations are made by incorporating the compounds of this invention in an inert, finely divided solid carrier and a surfactant which may be one or more emulsifying, wetting, dispersing or spreading agents or blend of these. The aminoamides are usually present in the range of 10 to 80% by weight and the surfactants in from 0.5 to 10% by weight. Commonly used emulsifying and wetting agents include polyoxyethylated alkylphenols, fatty alcohols, fatty acids and alkylamines, alkylarene sulfonates and dialkyl sulfosuccinates; spreading agents include such materials as glycerol mannitan laurate and a condensate of polyglycerol and oleic acid, modified with phthalic anhydride and dispersing agents include such materials as the sodium salt of the copolymer of maleic anhydride and an olefin such as diisobutylene, sodium lignin sulfonate and sodium formaldehydenaphthalene sulfonates.

One convenient method for preparing a solid formulation is to impregnate the aminoamide toxicant onto the solid carrier by means of a volatile solvent, such as acetone. In this manner, adjuvants, such as activators, adhesives, plant nutrients, synergists and various surfactants, may also be incorporated.

Emulsion concentrate formulations may be made by dissolving the aminoamides of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvents. Mixtures of solvents are commonly employed. The surfactants useful as emulsifying agents may constitute about 0.5% to 10% by weight of the emulsion concentrate and may be anionic, cationic or non-ionic in character. Anionic surfactants include alcohol sulfates or sulfonates, alkylarene sulfonates and sulfosuccinates. Cationic surfactants include fatty acid alkyl amine salts and fatty acid alkyl quaternaries. Non-ionic emulsifying agents which may be used include ethylene oxide adducts of alkylphenols, fatty alcohols, mercaptans or fatty acids. The concentration of the active ingredients may vary from 10 to 80% but is preferably in the range of 25 to 50%.

For use as pesticides, these compounds should be applied in an amount sufficient to exert the desired biocidal activity by techniques well known in the art.

In dilute sprays, they may be applied at concentrations of 0.05 to 20 pounds of the active ingredient per 100 gallons of spray, are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated sprays the materials are applied as mists.

The compounds of this invention may be used as the sole pesticidal agents or they may be used in conjunction with other fungicides or with insecticides, miticides and comparable pesticides.

Particularly effective embodiments of this invention are tabled below.

TABLE I

[Structures]

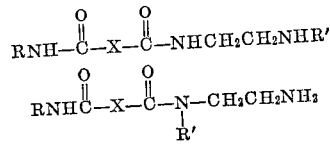

| | R | X | R' |
|---|---|---|---|
| Compounds of— | | | |
| Example 1 | $t\text{-}C_{18}H_{37}$ | $CH_2CH_2$ | $CH_2CH_2OH$ |
| Example 2 | $t\text{-}C_{18}H_{37}$ | $CH_2CH_2$ | $CH_2CH_2NH_2$ |
| Example 3 | $t\text{-}C_{18}H_{37}$ | CH-CH | $CH_2CH_2NH_2$ |
| Example 4 | $t\text{-}C_{18}H_{37}$ | CH-CH | $CH_2CH_2OH$ |
| Example 5 | $t\text{-}C_{18}H_{37}$ | $CH_2CH_2$ | H |

| Example 7 | $t\text{-}C_{18}H_{37}$ | $CH_2CH_2CH_2$ | $CH_2CH_2OH$ |
| Example 8 | $t\text{-}C_4H_9$ | $CH_2CH(C_{12}H_{23})$ | $CH_2CH_2NH$ |

The aminoamides of this invention were evaluated as fungicides by the standard slide spore germination test (cf. Phytopathology, 33, 627 (1943)), utilizing spores of *Alternaria solani* (Alt.), *Monilinia fructicola* (Mon.) and *Stemphylium sarcinaeforme* (Stem.). The values obtained for the concentration in parts per million (p.p.m.) which effectively controlled 50% of the spores ($ED_{50}$) are given in Table II.

TABLE II.—FUNGITOXICITIES OF AMINOAMIDES

| | $ED_{50}$ (p.p.m.) | | |
|---|---|---|---|
| | Alt. | Mon. | Stem. |
| Compound of (see Table I)— | | | |
| Example 1 | <1 | <1 | <1 |
| Example 2 | 1–10 | <1 | 1–10 |
| Example 3 | <1 | <1 | <1 |
| Example 4 | 10–50 | <1 | 1–10 |
| Example 5 | <1 | <1 | <1 |
| Example 6 | <1 | <1 | 10–50 |
| Example 7 | 10, 50 | <1 | 1–10 |
| Example 8 | 1–10 | 1–10 | |

Representative aminoamides of this invention were evaluated for the control of apple scab in a protective type test. In this test, apple seedlings at the 4 to 5 leaf stage were sprayed with the chemical at concentrations varying from one-eighth to one pound per 100 gallons of spray and then allowed to dry. There were 4 plants per treatment. The plants were then inoculated with a conidial suspension of *Venturia inaequalis* containing 30,000 spores per milliliter. The inoculated plants thereafter, were held in the greenhouse at 70° F. until apple scab lesions appeared 8 to 11 days later. The percent control of the apple scab was calculated by comparing the amount of leaf area infected on treated plants with the infected leaf area on untreated controls. The percent disease control is given below in Table III.

TABLE III.—PROTECTIVE APPLE SCAB FUNGICIDE TESTS

| | Percent Control of Apple Scab at— | | |
|---|---|---|---|
| | 1 lb. | 0.25 lb. | 0.125 lb. |
| Compound of (see Table I)— | | | |
| Example 1 | 99 | 97 | 96 |
| Example 3 | 97 | 89 | 83 |
| Example 7 | | 90 | 79 |

Representative compounds of this invention were evaluated in a greenhouse test in which their value in eradicating apple scab was measured. In this test, apple seedlings were inoculated with a conidial suspension of apple scab spores, then allowed to incubate overnight under controlled temperature and humidity, after which the plants were held in the greenhouse until lesions appeared. At this point, the diseased apple seedlings were sprayed with aqueous suspensions of the aminoamides in a dosage series. About 5 days later, the amount of eradication was determined by the change in color and crispness of the lesions and the percent eradication calculated. The results are given in Table IV.

TABLE IV.—ERADICATIVE APPLE SCAB FUNGICIDE TESTS

| Compound of (see Table I)— | Percent Control of Apple Scab at— | |
|---|---|---|
| | 1 lb. | 0.50 lb. |
| Example 1 | 91 | 58 |
| Example 7 | 83 | 7 |

In this test, glyodin, a commercial fungicide based on 2-heptadecylglyoxalidine acetate, when used at one quart and one pint of a 30% solution per 100 gallons of spray, gave essentially no eradication of apple scab.

Representative aminoamides were evaluated for the control of apple scab in a type of eradicative test in which a phenomenon known as "kick-back" is measured. In this test, apple seedlings were inoculated with a conidial suspension of *Venturia inaequalis* and then allowed to incubate overnight in humidity chambers at 65° F. Twenty-four hours later, the plants were sprayed to run-off with an aqueous suspension of the test chemical at a concentration of one pound per 100 gallons of spray. The plants were held in a greenhouse for about 11 days to allow disease lesions to develop. The percent disease control was calculated by comparing the infected leaf area developed in the control plants (untreated) and in the treated plants. Table V gives the results.

TABLE V.—TWENTY-FOUR HOUR KICK-BACK APPLE SCAB FUNGICIDE TESTS

| Compound of (see Table I)— | Percent Control of Apple Scab— | |
|---|---|---|
| | 1 lb. | 0.50 lb. |
| Example 1 | 97 | |
| Example 7 | 56 | 38 |

The compounds of Example 1 were tested for control of bacterial leaf spot of peppers, the causal organism of which is *Xanthomonas vesicatoria*. These compounds gave at least 75% control when they were applied to the plants in an aqueous medium containing as little as 0.5 lb. of the active ingredient per 100 gallons of spray.

In a test for the control of tomato anthraconose, the cause organism of which is *Colletotricum phomoides*, compounds of Example 3 showed 96% control of a dosage of 2 lbs. per 100 gallons of spray.

In field tests for apple scab control caused by *Venturia inaequalis*, the aminoamides of the present invention showed excellent protection and scab eradication in dosages as low as 0.5 lb. per 100 gallons of spray. The compounds of Example 1 were especially outstanding in these apple scab control tests. It was also observed that the apple trees treated with the said aminoamides were essentially free of mites, whereas untreated trees were heavily infested.

What is claimed is:

1. An aminoamide selected from the group consisting of $$RNH-\overset{O}{\overset{\|}{C}}-X-\overset{O}{\overset{\|}{C}}-\underset{\underset{R'}{|}}{N}-CH_2CH_2NH_2 \quad (I)$$

$$RNH-\overset{O}{\overset{\|}{C}}-X-\overset{O}{\overset{\|}{C}}-NHCH_2CH_2NHR' \quad (II)$$

and mixtures of said (I) and (II) wherein
R is a tertiary-alkyl group of 4 to 24 carbon atoms,
R' is selected from the group consisting of hydrogen, 2-aminoethyl and 2-hydroxyethyl and
X is selected from the group consisting of [ethenylene, ethylene,] trimethylene, dodecenylethylene and [1,2-cyclohexenylene] 1,2-cyclohex-4-enylene, and additionally when R' is 2-hydroxyethyl, X may be ethenylene or ethylene, and acid-addition salts of said aminoamide.

2. An aminoamide selected from the group consisting of $$t\text{-}C_{18}H_{37}NH\overset{O}{\overset{\|}{C}}CH_2CH_2\overset{O}{\overset{\|}{C}}N\diagup\overset{CH_2CH_2NH_2}{\diagdown CH_2CH_2OH} \quad (I)$$

$$t\text{-}C_{18}H_{37}NH\overset{O}{\overset{\|}{C}}CH_2CH_2\overset{O}{\overset{\|}{C}}NHCH_2CH_2NHCH_2CH_2OH \quad (II)$$

and mixtures of said (I) and (II), and acid addition salts of said aminoamide.

3. An aminoamide selected from the group consisting of $$t\text{-}C_{18}H_{37}NH-\overset{O}{\overset{\|}{C}}\diagup\diagdown\overset{O}{\overset{\|}{C}}-N(CH_2CH_2NH_2)_2 \quad (I)$$

$$t\text{-}C_{18}H_{37}NH-\overset{O}{\overset{\|}{C}}\diagup\diagdown\overset{O}{\overset{\|}{C}}-NHCH_2CH_2NHCH_2CH_2NH_2 \quad (II)$$

and mixtures of said (I) and (II), and acid-addition salts of said aminoamide.

4. An aminoamide selected from the group consisting of $$t\text{-}C_{18}H_{37}NH\overset{O}{\overset{\|}{C}}CH_2CH_2CH_2\overset{O}{\overset{\|}{C}}-N\diagup\overset{CH_2CH_2NH_2}{\diagdown CH_2CH_2OH_2} \quad (I)$$

$$t\text{-}C_{18}H_{37}NH\overset{O}{\overset{\|}{C}}CH_2CH_2CH_2\overset{O}{\overset{\|}{C}}-NHCH_2CH_2NHCH_2CH_2OH \quad (II)$$

and mixtures of said (I) and (II), and acid-addition salts of said aminoamide.

5. An aminoamide selected from the group consisting of $$t\text{-}C_4H_9NH\overset{O}{\overset{\|}{C}}CH_2CH(C_{12}H_{25})\overset{O}{\overset{\|}{C}}-N(CH_2CH_2NH_2)_2 \quad (I)$$

$$t\text{-}C_4H_9NH\overset{O}{\overset{\|}{C}}CH_2CH(C_{12}H_{25})\overset{O}{\overset{\|}{C}}-NHCH_2CH_2NHCH_2CH_2NH_2 \quad (II)$$

and mixtures of said (I) and (II), and acid-addition salts of said aminoamides.

References Cited

UNITED STATES PATENTS

| 3,336,384 | 8/1967 | Gee et al. | 260—561 |
| 3,006,848 | 10/1961 | Caruso. | |
| 2,982,633 | 5/1961 | Andress. | |
| 2,839,732 | 6/1958 | Lindstrom et al. | |
| 2,540,171 | 2/1951 | Kiff. | |

FOREIGN PATENTS 814,452  6/1959  Great Britain.

OTHER REFERENCES

J. O. Jilek and M. Protiva, Collection of Czecholovak Chemical Communications, 15, pp. 659–670 (1950).

HENRY R. JILES, *Primary Examiner.*

H. I. MOATZ, *Assistant Examiner.*